United States Patent
Al-Gharaibeh et al.

(10) Patent No.: US 10,326,617 B2
(45) Date of Patent: Jun. 18, 2019

(54) WEARABLE INTELLIGENT COMMUNICATION HUB

(71) Applicant: ARCHITECTURE TECHNOLOGY, INC., Minneapolis, MN (US)

(72) Inventors: Jafar Al-Gharaibeh, Minneapolis, MN (US); Benjamin L. Burnett, Prior Lake, MN (US)

(*) Notice: Subject to any disclaimer, the term of this patent is extended or adjusted under 35 U.S.C. 154(b) by 79 days.

(21) Appl. No.: 15/253,173

(22) Filed: Aug. 31, 2016

(65) Prior Publication Data

US 2017/0302478 A1 Oct. 19, 2017

Related U.S. Application Data

(60) Provisional application No. 62/323,058, filed on Apr. 15, 2016.

(51) Int. Cl.
  *H04L 12/66* (2006.01)
  *H04L 29/06* (2006.01)
  (Continued)

(52) U.S. Cl.
  CPC .......... *H04L 12/66* (2013.01); *H04L 65/1036* (2013.01); *H04L 65/1059* (2013.01);
  (Continued)

(58) Field of Classification Search
  CPC ...... H04L 12/66; H04L 65/1033; H04W 4/90; H04W 4/70; H04W 4/22; H04W 4/005; H04W 88/16
  See application file for complete search history.

(56) References Cited

U.S. PATENT DOCUMENTS

| 7,203,173 B2 | 4/2007 | Bonney et al. |
| 7,317,733 B1 | 1/2008 | Olsson et al. |

(Continued)

OTHER PUBLICATIONS

Burnett, B. & Budenske, J., "Scale-Free Mesh Mobile Wireless Networks", Trends in Tactical Networking, vol. 1, Ch. 1, Ithaca, NY, Digital Systems Press, 2011.

(Continued)

*Primary Examiner* — Joseph E Dean, Jr.
(74) *Attorney, Agent, or Firm* — Carlson, Caspers, Vandenburgh & Lindquist, P.A.

(57) ABSTRACT

A communication hub that manages communication signals and sensor signals is provided. Communication signal gateways receive and transmit the communication signals with a plurality of different communication signal formats. Sensor signal gateways in turn receive the sensor signals with a plurality of different sensor signal formats. The controller dynamically interfaces the different communication signal formats of the received communication signals with a communication hub signal format to establish communication links with the communication systems associated with the received communication signals. The controller further dynamically interfaces the different sensor signal formats of the received sensor signals into the communication hub signal format used by the communication hub to gather sensor information. The controller further establishes at least one routing path to a destination hub using at least one of the established communication links. The controller further yet communicates the sensor information through the at least one established routing path.

26 Claims, 8 Drawing Sheets

(51) Int. Cl.
*H04W 4/70* (2018.01)
*H04W 4/90* (2018.01)
*H04W 88/16* (2009.01)

(52) U.S. Cl.
CPC .............. *H04W 4/70* (2018.02); *H04W 4/90* (2018.02); *H04W 88/16* (2013.01)

(56) References Cited

U.S. PATENT DOCUMENTS

| | | | |
|---|---|---|---|
| 7,523,198 | B2 | 4/2009 | Wu et al. |
| 9,225,637 | B2 | 12/2015 | Ramanujan et al. |
| 2001/0027484 | A1 | 10/2001 | Nishi |
| 2003/0046390 | A1 | 3/2003 | Ball et al. |
| 2003/0112808 | A1 | 6/2003 | Solomon |
| 2003/0125028 | A1 | 7/2003 | Reynolds |
| 2006/0187858 | A1 | 8/2006 | Kenichi et al. |
| 2008/0049641 | A1 | 2/2008 | Edwards et al. |
| 2010/0061231 | A1 | 3/2010 | Harmatos et al. |
| 2010/0164736 | A1* | 7/2010 | Byers .............. H04L 12/12 340/657 |
| 2010/0235514 | A1 | 9/2010 | Beachem |
| 2010/0268935 | A1 | 10/2010 | Rodgers et al. |
| 2010/0329270 | A1 | 12/2010 | Asati et al. |
| 2011/0125921 | A1 | 5/2011 | Karenos et al. |
| 2011/0134906 | A1* | 6/2011 | Garudadri .............. G01D 21/00 370/350 |
| 2012/0039202 | A1* | 2/2012 | Song .................... H04W 72/00 370/252 |
| 2012/0063316 | A1 | 3/2012 | Ghanwani et al. |
| 2012/0106566 | A1 | 5/2012 | Zarrabi et al. |
| 2012/0327811 | A1 | 12/2012 | Nozaki |
| 2013/0215810 | A1 | 8/2013 | Wang et al. |
| 2014/0348024 | A1* | 11/2014 | Mishra .................. H04W 76/10 370/254 |
| 2014/0369489 | A1 | 12/2014 | Ermann et al. |
| 2015/0010002 | A1 | 1/2015 | Duda et al. |
| 2015/0124586 | A1 | 5/2015 | Pani |
| 2015/0257081 | A1 | 9/2015 | Ramanujan et al. |
| 2015/0318911 | A1* | 11/2015 | Samios .............. H04B 7/15507 370/315 |
| 2016/0080274 | A1* | 3/2016 | Meyer ................... H04L 47/18 370/231 |

OTHER PUBLICATIONS

Burnett, B., Bowering, G., et al., "Multi-Radio Nodes for Mobile Mesh Networks for Emergency Response and Battle Command Systems", IEEE/AFCEA MilCom, 2007.

"Airborne Network Laydown", Final Report, ATC-NY, pp. 1-116, Jun. 30, 2009.

"Internet Protocol, DARPA Internet Program Protocol Specification", Sep. 1981, pp. 1-50, USA.

"OSPF Design Guide", Cisco, pp. 1-55, 2005.

"Tactical Targeting Network Technology, Dynamic, Robust Waveform enabling NetCentric Communications for Today's Warfighter", Rockwell Collins, pp. 1-8, 2009, USA.

"Talk II—SINCGARS, Multiservice Communications Procedures for the Single-Channel Ground and Airborne Radio System", Marine Corps, pp. 1-77, May 1996.

"Transmission Control Protocol, DARPA Internet Program Protocol Specification", Sep. 1981, pp. 1-90, USA.

"Wideband Gapfiller System", GlobalSecurity.org, http://www.globalsecurity.org/space/systems/wgs.htm, pp. 1-5, Oct. 4, 2016.

Berry, et al., "PPP over Ethernet (PPPoE) Extensions for Credit Flow and Link Metrics", Internet Engineering Task Force, Feb. 2010, pp. 1-21, USA.

Burbank, Jack L. et al. "Key Challenges of Military Tactical Networking and the Elusive Promise of MANET Technology," IEEE Communications Magazine, Nov. 2006, pp. 39-45.

Chau, Chi-Kin et al. "IDRM: Inter-Domain Routing Protocol for Mobile Ad Hoc Networks," Technical Report No. 708, 2008. UCAM-CL-TR-708, ISSN 1476-2986 University of Cambridge, Jan. 2008, pp. 1-24.

Lee, Seung-Hoon, "Inter MR: Inter-MANET Routing in Heterogeneous MANETs," Proceedings of MASS' 2010, Nov. 2010, 10 pages.

Macker, Joseph P. et al. "Heterogeneous Architecture Support for Wireless Network Dynamics and Mobility," Naval Research Laboratory NRL/MR/5520-00-8513. Dec. 29, 2000, 32 pages.

Pei, Dan et al. "BGP-RCN: Improving BGP Convergence Through Root Cause Notification," Computer Networks. Sep. 28, 2004, 20 pages.

Perkins, C., "Minimal Encapsulation within IP", Internet Engineering Task Force, Oct. 1996, pp. 1-6, USA.

Pizzi, Steven V. "A Routing Architecture for the Airborne Network" MILCOM Paper Tracking No. 248, Version 5.40. 2007 The Mitre Corporation. May 21, 2007, pp. 1-7.

Rekhter, Y. et al. "A Border Gateway Protocol 4 (BGP-4)" IETF RFC 1771, Mar. 1995, [online] [retrieved on Jul. 16, 2014], retrieved from the internet 50 pages.

Rekhter, Y. et al. "Application of the Border Gateway Protocol in the Internet" IETF RFC 1772. Mar. 1995, 19 pages.

Spagnolo, Phillip A., et al., "Boeing Quagga Software", The Boeing Company, pp. 1-32, 2006.

U.S. Patent and Trademark Office, "Office Action", U.S. Appl. No. 14/613,894, dated May 9, 2017, pp. 1-4.

U.S. Patent and Trademark Office, "Office Action", U.S. Appl. No. 14/613,894, dated Aug. 30, 2016, pp. 1-14.

U.S. Patent and Trademark Office, "Office Action", U.S. Appl. No. 15/425,364, dated May 16, 2018, pp. 1-13.

* cited by examiner

WEARABLE INTELLIGENT COMMUNICATION HUB

CROSS-REFERENCE TO RELATED APPLICATIONS

This Application claims priority to U.S. Provisional Application Ser. No. 62/323,058, same title herewith, filed on Apr. 15, 2016, which is incorporated in its entirety herein by reference.

STATEMENT REGARDING FEDERALLY SPONSORED RESEARCH OR DEVELOPMENT

This invention was made with United States Government support under contract HSHQDC-15-C-00024. As such, the United States Government may have certain rights in the invention.

BACKGROUND

In dealing with a coordinated response to an emergency situation it is imperative to have a reliable communication system. Moreover, the more data collected and conveyed to a central dispatch regarding each responder and the situation they are dealing with, the better to coordinate a response and to direct further help as needed. The enormous growth of the mobile computing industry (e.g., smartphones, tablets, wearable devices, and the Internet of Things (IoT)) has been accompanied by a corresponding explosion in low-cost sensors and the data they produce. At the same time, wireless communication technologies have grown immensely in terms of speed and geographical coverage. This technological advancement can be both a blessing and a curse to first responders. Undoubtedly the technology can make first responders more effective, however, the wide array of communication tools such as land mobile radios (LMR), smartphones, and other available communication devices and sensors can be overwhelming and distracting. Worse, wireless communication connectivity can be sporadic in disaster areas.

In addition, one of the main challenges to building a communication system for first responders is the fact that most radio (especially tactical radio) networks only support IP routing within the same radio type and the same network subnet. Communication packets in these systems do not leave the subnet and are referred to as non-transit packets. This means that these radio devices generally cannot route network packets with IP addresses outside the radio subnet. One method to handle transit traffic is to have gateways that tunnel the data through radio networks. However, these gateways also require static pre-configuration with fixed IP tunnels. This static configuration might not be possible in certain situations where IP address and link attributes are not known beforehand. Furthermore, even when such configuration is possible, it cannot handle very dynamic situations where link quality and availability is very unpredictable leaving it impractical for most situations especially those fluid situations that face first responders.

For the reasons stated above and for other reasons stated below which will become apparent to those skilled in the art upon reading and understanding the present specification, there is a need in the art for an effective and efficient communication system for first responders and the like.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

Embodiments of the present invention provide a wearable intelligent communication hub that handles the complexity of underlying communication channels and sensors while providing an easy-to-use plug-and-play interface that lets first responders focus on their job. In embodiments, a communication hub seamlessly establishes communication links with different types of communication systems to create a communication network where information can be passed to and from the communication hub. Moreover, embodiments of the communication hub gather sensor information and pass the gathered sensor data through the established communication links that make up the communication network. In some embodiments, the communication hub enacts routing instructions that creates a communication path through communication links to command or emergency operation centers as well as other teammates in the same response operation.

In one embodiment, a communication hub that manages communication signals between the communication hub and a plurality of communication systems that use a plurality of different communication signal formats to form a communication network is provided. The communication hub also manages sensor signals between the communication hub and a plurality of sensors that use a plurality of different sensor signal formats. The communication hub includes communication signal gateways, sensor signal gateways, a controller, a storage medium and a power source. The communication signal gateways are configured to receive and transmit the communication signals with the plurality of different communication signal formats. The sensor signal gateways in turn are configured to receive the sensor signals with the plurality of different sensor signal formats. The controller is configured to dynamically interface the different communication signal formats of the received communication signals at the communication signal gateways with a communication hub signal format used by the communication hub to establish communication links with the communication systems associated with the received communication signals. The controller is further configured to dynamically interface the different sensor signal formats of the received sensor signals at the sensor signal gateways into the communication hub signal format to gather sensor information. The controller is further configured to establish at least one routing path to a destination hub using at least one of the established communication links. The controller further yet is configured to communicate the sensor information through the at least one established routing path. The storage medium is in communication with the controller. The storage medium is configured to store operating functions of the controller. The power source is selectively coupled to provide power for the communication hub.

In an embodiment, the controller is further configured to implement communication manager, configuration manager and sensor manager functions stored in the storage medium. The communication manager function is configured to establish the communication links through the communication signal gateways. The configuration manager function is configured to establish the at least one established routing path to the destination hub using at least one of the established communication links. The sensor manager function is configured to dynamically interface the different sensor signal formats of the sensor signals received at the sensor signal gateways into a communication hub sensor signal format used by the communication hub and to communicate the sensor information through the at least one established routing path.

In an embodiment, the communication signal gateways further comprise a plurality of communication receivers and a plurality of communication transmitters. The plurality of communication receivers include at least one first communication receiver that is configured to receive a first type of communication signal and at least one second communication receiver that is configured to receive a second type of communication signal. The plurality of communication transmitters include at least one first communication transmitter that is configured to transmit the first type of communication signal and at least one second communication transmitter that is configured to transmit the second type of communication signal.

In an embodiment, the controller is further configured to monitor for the different types of communication signals received at the communication signal gateways.

In an embodiment, the communication hub further includes a power on indicator and an established communication link indicator. The power on indicator is selectively coupled to the power source and is configured to indicate when the communication hub is operational. The established communication link indicator is in communication the controller. The established communication link indicator is configured to indicate when at least one established communication link has been established.

In another embodiment, a method of operating a communication hub that manages communication signals between the communication hub and a plurality of communication systems using a plurality of different communication signal formats to form a communication network is provided. The communication hub also manages sensor signals between the communication hub and a plurality of sensors using a plurality of different sensor signal formats. The method includes monitoring for the communication signals from the plurality of communication systems. Upon detection of at least one communication signal from one of the plurality of communication systems, automatically interfacing a communication signal format of the at least one detected communication signal with a communication hub signal format used by the communication hub to establish a communication link with the one of the plurality of communication systems. Moreover, upon receiving at least one sensor signal from the plurality of sensors, automatically interfacing a sensor signal format of the at least one received sensor signal to gather sensor information with the communication hub. Communicating the sensor information through the established communication link using the communication signal format of the detected at least one communication signal.

In an embodiment, receiving the at least one of sensor signal from the at least one of the plurality of sensors further includes receiving a plurality of different type sensor signals from the plurality of the sensors. At least one sensor of the plurality of sensors being of a different type than another sensor of the plurality of sensors.

In an embodiment, the sensor signals from the plurality of sensors comprises at least one sensor signal from at least one of temperature sensors, heartbeat sensors, blood pressure sensors, carbon monoxide sensors, oxygen level sensors, global positioning sensors, magnetometer sensors, accelerometer sensors, gyroscope sensors, touch sensors, microphones and luminance sensors.

In an embodiment, when more than one communication link has been established, determining a best route to a destination hub. The sensor data is forwarded to the destination hub via the determined best route.

In an embodiment, the best route is determined based at least in part on one of a least cost route, a most reliable route and a most secure route.

In an embodiment, sensor information is stored in a storage medium of the communication hub.

In an embodiment, the sensor information is prioritized based on importance. The sensor information is then communicated pursuant to the prioritization.

In an embodiment, when more than one communication link has been established, the best routes to a destination hub is ranked based at least in part on one of least cost paths, most reliable paths and a most secure paths.

In an embodiment, a communication path to said destination hub from a first best ranked route is rerouted to a second best ranked route when a break in the first communication path to the destination hub is detected.

In an embodiment, the sensor information in communication signals is load balanced between at least two of the established communication paths to the destination hub.

In an embodiment, the at least one sensor is manipulated with sensor manipulation instructions communicated to the communication hub through the established communication link.

In an embodiment, the monitoring for the communication signals further comprises monitoring for at least one of WiFi signals, Long Term Evolution (LTE) signals, Land Mobile Radio (LMR) signals, Satellite signals, Bluetooth signals, Radio signals and Near field Communication (NFC) signals.

In an embodiment, the sensor signal comprises at least one of a WiFi signal, Bluetooth signal, Bluetooth Low-Energy signal, ZigBee signal and 6LOWPAN signal.

In an embodiment, select detecting and transmitting features of the communication hub are selectively turned on and off relating to specific communication signal formats not being used by the communication hub to conserve battery power.

In an embodiment, routing instructions received in the at least one detected communication signal are read. The information contained in the at least one detected communication signal are communicated through another established communication link pursuant to the received routing instructions.

In an embodiment, at least one of the routing instructions and the information contained in the at least one communication signal is stored in a storage medium of the communication hub.

In another embodiment, a method of operating a communication network having at least one communication hub is provided. The at least one communication hub manages communication signals between the at least one communication hub and a plurality of communication systems using a plurality of different communication signal formats. The at least one communication hub also manages sensor signals between the at least one communication hub and a plurality of sensors using a plurality of different sensor signal formats. The method includes receiving the sensor signals from the plurality of different types of sensors at sensor signal gateways of the at least one communication hub. The sensor signal formats of the sensor signals from the plurality of sensors are dynamically interfaced into a communication hub signal format used by the at least one communication hub to gather sensor information used by the least one communication hub. The communication signals received by communication signal gateways of the at least one communication hub are detected. The sensor signal formats of the detected communication signals are dynamically interfaced with the communication hub signal format of the at least one communication hub to establish at least one communication link between the at least one communication hub and the communication systems associated with the detected communication signals. At least one routing path from the at least one communication hub to a destination hub is determined using at least one of the at least one established communication link. The sensor information and routing information is communicated through the at least one routing path.

In an embodiment, at least one of the plurality of different type sensors is controlled through the at least one routing path to the at least one communication hub.

In an embodiment, the plurality of communication systems comprise at least one of other communication hubs, WiFi, Long Term Evolution (LTE), Land Mobile Radio (LMR), Satellite, Bluetooth, Radio and Near field Communication (NFC).

In an embodiment, the plurality of different types of sensors comprise at least one of temperature sensors, heartbeat sensors, blood pressure sensors, carbon monoxide sensors, oxygen level sensors, global positioning sensors, magnetometer sensors, accelerometer sensors, gyroscope sensors, touch sensors, microphones and luminance sensors.

In an embodiment, the communicated sensor information is displayed on a display with a visualization tool.

In an embodiment, an alarm is set off when the sensor information has reached a predetermined limit.

In an embodiment, dynamically changing properties of a communication signal between the at least one communication hub and another communication hub to circumvent at least one of interferences and obstacles.

BRIEF DESCRIPTION OF THE DRAWINGS

The present invention can be more easily understood and further advantages and uses thereof will be more readily apparent, when considered in view of the detailed description and the following Figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
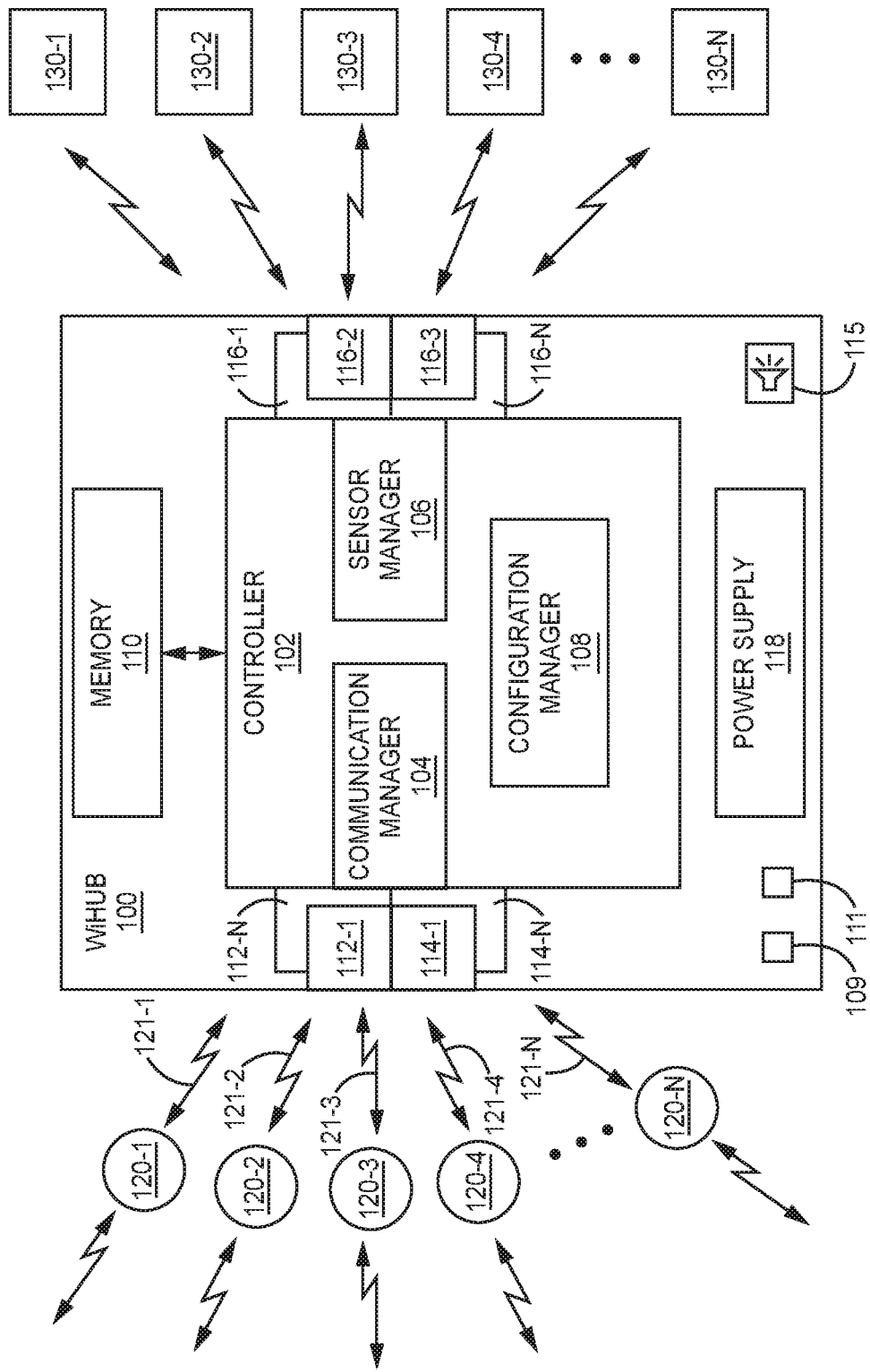
FIG. 1 is a block diagram of a communication hub of one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a wearable intelligent communication hub (WiHub) that handles the complexity of underlying communication channels and sensors while providing an easy-to-use plug-and-play interface that lets first responders focus on their job. WiHub embodiments dissolve barriers between responders and the many available sources of critical information. A WiHub can be referred generally as a communication hub. In embodiments, a WiHub seamlessly establishes communication links with different types of communication systems to create a communication network where information can be passed to and from the WiHub. Moreover, embodiments of the WiHub gather sensor information and pass the gathered sensor data on through the established communication links that make up the communication network. In some embodiments, the WiHub enacts routing instructions that creates a communication path through communication links to a command center. If more than one communication link is available, embodiments of the WiHub automatically picks the best route for data to the command center. In an embodiment, the WiHub also includes an auto-detect that detects any link-quality degradation and reroutes data over better links without any user intervention. Some WiHub embodiments may include automated and remote control capabilities in addition to a modular design as further discussed below. Moreover, in an embodiment, the WiHub may include a hardened housing to protect the components. In addition, the WiHub may be lightweight and compact so as to not interfere with the operations of an associated responder.

The safety of emergency responders is a high priority for incident commanders whose ability to track and monitor multiple responders is limited by the series of request-response messages initiated by the commander. By automating much of the personnel safety monitoring with sensors that track each responder's physiological and personal alert safety system (PASS) state, missions can be completed faster and safer. However, operating conditions such as data-transmission and communication-link interference pose many challenges. Embodiments of WiHub may allow all sensors to connect to one place while enabling their data to be stored on the WiHub and/or stream through any available communication medium, regardless of which radio frequency is used by a specific sensor. At the same time, these sensors may be managed remotely by the incident commander, again allowing the first responders to focus on their jobs at the scene and incident commanders to select sensor data from any available sensor.

Formed communication networks with WiHubs include the ability to quickly and automatically connect to all sensors available to the first responder and the ability to use and utilize multiple links at the same time to connect to other WiHub devices within the same team and also with a command center. This provides an innovative multi-frequency network that has diversity and robustness that has several advantages over single frequency systems. For example, a single frequency system would have little redundancy and every node would be prone to the same interference and frequency jamming attacks. In embodiments, the diverse system is robust and can withstand natural interference, faults and even attacks. In an embodiment, a formed WiHub network is a diverse frequency system that is not only robust, but also creates broader compatibility with more available sensors and equipment.

Referring to FIG. 1, an embodiment of the WiHub 100 is illustrated. The WiHub 100 includes a controller 102, a storage medium such as a memory 110, and a power supply 118. In general, the controller 102 (processor) may include any one or more of a microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to controller 102 herein may be embodied as software, firmware, hardware or any combination thereof. Memory 110 may include computer-readable instructions that, when executed by controller 102 provide functions of the WiHub. Such functions may include the functions of a communication manager 104, a sensor manager 106 and configuration manager 108 as discussed in detail below. The computer readable instructions may be encoded within the memory 110. Memory 110 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

In one embodiment, the power supply 118 is a battery that may be designed to last for at least a 12 hour shift. As discussed above, the memory 110 is used in part to store functional instructions that are implemented by the controller 102. In an embodiment, the WiHub may include an activation signal 109, such as but not limited to, a light emitting diode (LED), to indicate the power source 118 had been activated and communication signal 111, such as but not limited to, a LED, to indicate if a communication link has been established with the WiHub as discussed in detail below. An embodiment of the WiHub may also include a speaker 115 that may be used to provide audio communications to the user of the WiHub. The speaker 115 may also be used to communicate alarm signals to the responder.

As discussed above, the controller 102 is designed to control operations of the WiHub 100. Moreover, the controller 102, in embodiments, implements functions set out by the communication manager 104, the sensor manager 106 and the configuration manager 108. The communication manager 104 is in communication with communication signal gateways 112-1 through 112-N and 114-1 through 114-N which in this embodiment are communication receivers 112-1 through 112-N and communication transmitters 114-1 through 114-N. The communication signal gateways 112-1 through 112-N and 114-1 through 114-N of the WiHub 100 are used by the communication manager 104 in establishing communication links 121-1 through 121-N to communication systems 120-1 through 120-N. Example communication systems may include, but are not limited to, WiFi, Long Term Evolution (LTE), Land Mobile Radio (LMR), Satellite, Bluetooth, Radio and Near Field Communication (NFC). Hence, the communication manager 104 can establish communication links with different types of communication signals from different types of communication systems in embodiments. To accomplish this, the communication manager 104 automatically interfaces signal formats of the communication systems with a communication hub signal format used by the WiHub 100.

The sensor manager 106 is in communication with various sensors 130-1 through 130-N via sensor signal gateways 116-1 through 116-N. The sensor signal gateways 116-1 through 116-N may include a port or wireless receiver and transmitter that receives sensor signals from associate sensors 130-1 through 130-N. The sensors may include, but are not limited to, health sensors, such as but not limited to, temperature sensors, heartbeat sensors, blood pressure sensors, carbon monoxide sensors, oxygen level sensors, as well as global positioning sensors, magnetometer sensors, accelerometer sensors, gyroscope sensors, touch sensors, microphones and luminance sensors. The sensor manger 106 of the controller 102 manages sensor information and interfaces sensor signals received by the sensor signal gateways 116-1 through 116-N into the communication hub signal format to gather sensor information. The interface function of the sensor manager is important since different types of sensors may use different types of communication. For example, different sensors may use different radio technologies to transmit their data such as, but not limited to, WiFi, Bluetooth, Bluetooth Low-Energy, ZigBee, 6LOWPAN, etc. In an embodiment, the sensor manager 106 includes a unified sensor management Application Programming Interface (API) and services that is used to dynamically interface with different types of sensor signals into uniform sensor information that is used by WiHub for communications and storage. The sensor manager 106 in another embodiment includes a unified sensor application interface to handle detecting and registering sensors and also the handling of sensor information. In embodiments, the sensor manager 106 interfaces different standards, communication and operating protocols, and data formats used by all sensors 130-1 through 130-N that are used by first responders into the WiHub 100.

The sensor manager 106, in an embodiment, is designed to also stream sensor information back to a destination hub (such as command center 502 illustrated in FIG. 5) via the communication manager 104. In further embodiments, the sensor manager 106 is designed to allow remote control of at least one of the sensors 130-1 through 130-N by an external signal, such as, but not limited to, an external signal from the command center 502. That remote control capability has two main benefits. First, it enables first responders to focus on more critical parts of their mission while a remote person operates the sensors and second it allows for remote monitoring of the health and the conditions of a first responder in life threatening situations. In addition to remote control features, the sensor manager 106 in one embodiment also has the ability to detect danger or life threatening situations and automatically send alerts to the command center 502. For example, if a carbon monoxide sensor hits a certain threshold, a message is sent immediately to the command center 502.

The configuration manger 108 of the controller 102 provides a set of services that handle the configuration and management of WiHub devices and WiHub networks. In one embodiment, the configuration manager manages setup, configuration, health of device and its components locally and remotely, as well as service allocation. These services may include address allocation, network setup services (DHCP) and Naming Services (DNS). The services may further include node and asset tracking of status and location for management and routing purposes. Further the service may still further include optional advanced services, as but not limited to, Quality of Service (QOS), throughput improvements, Server allocations, Geolocation messaging, etc.

Address allocation services of the configuration manager 108 for mesh networks are typically based on some form of Dynamic Host Configuration Protocol (DHCP), but other proprietary systems exist as well, such as but not limited to the Dynamic Configuration and Distribution Protocol (DCDP) and the Dynamic Router Configuration Protocol (DRCP). Dynamic DHCP with enhancements may be used to handle the multiple radios on each node. This involves receiving and dealing with redundant requests received at different times through RF links of differing speeds and frequencies. This aides in the robustness of the overall network, but may cause some management headaches at the local nodes.

Node tracking and status monitoring is not normally required service in networks, however in the WiHub network this may become a crucial service for efficient routing. In emergency responder networks, nodes may be moving in and out of range of various other nodes creating and dropping links all the time. This changes the topology of the network and may break current TCP/IP connections causing non optimal data transfers. By tracking nodes which are intermittent but at a relatively constant rate this link can still be used but in a diminished capacity. By adjusting and forcing certain changes to the TCP/IP Routing tables, these links may remain active to provide viable (although slower) links and paths for data transfers without breaking TCP/IP connection any more than is needed. When these links fall below a threshold they may still be dropped and other redundant links or paths may be used instead. In addition, tracking location and status of nodes may be used later to provide geolocation based routing and message delivery as an optional service. Embodiments of the configuration manager 108 may employ optional services as discussed briefly above, based on customer input and analysis of what services are needed. These services may include, but are not limited to, address allocation services, link status services and location tracking services for dynamic mobile networks.

Figure 2:
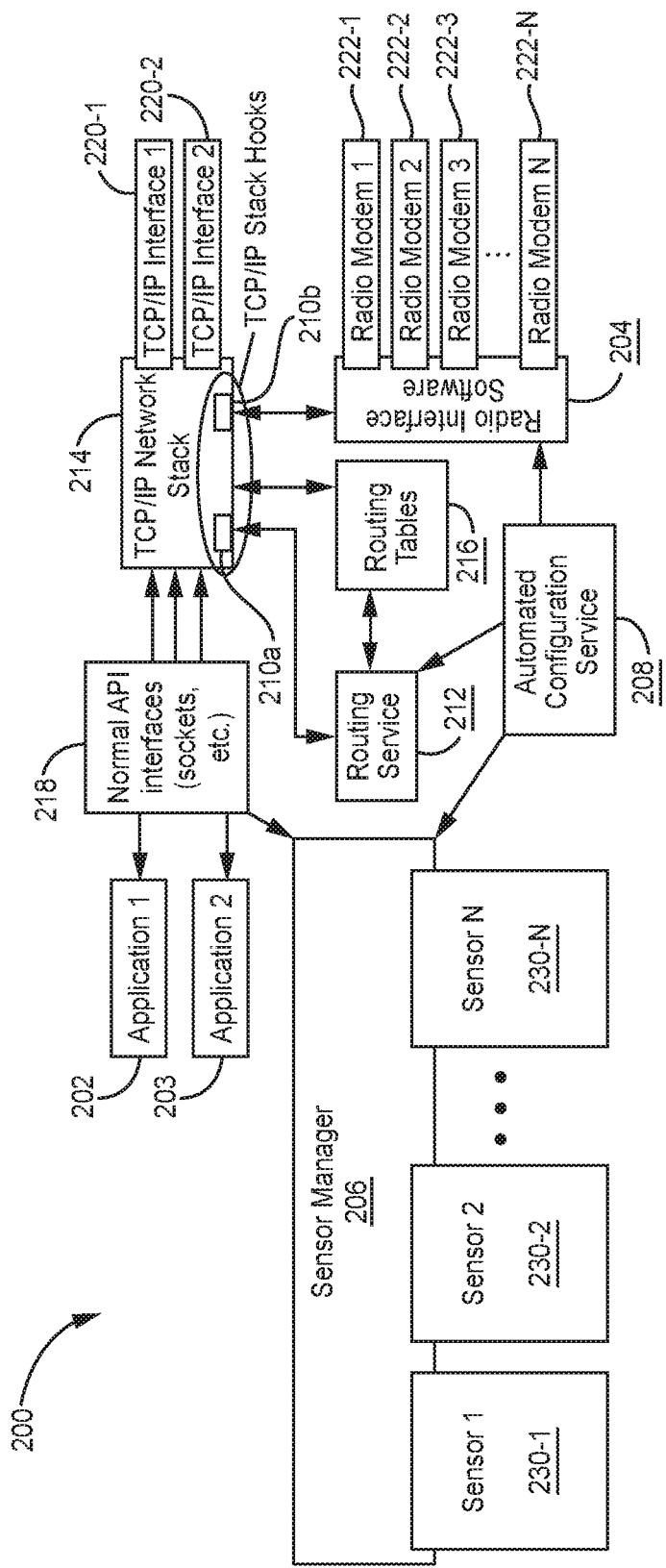
FIG. 2 is a block diagram of software architecture of a communication hub of an embodiment of the present invention.

An illustration of software architecture WiHub 200 of an embodiment is illustrated in the block diagram of FIG. 2. As with WiHub 100, the software architecture WiHub 200 also includes a sensor manager 206, an automated configuration and management service 208 and a communication manager. In an embodiment, the communication manager includes radio interface manger 204, TCP/IP stack hooks 210a and 210b, routing service 212 and routing tables 216. The sensor manager 206 is in communication with a plurality of sensors 230-1 through 230-N. The sensors 230-1 through 230-N may include, but are not limited to, health status sensors, temperature sensors, Global Positioning Sensors (GPS), magnetometer sensors, accelerometer sensors, gyroscope sensors, touch sensors, microphones and luminance sensors. The radio interface manager 204 is in communication with radio modems 221-1 through 222-N. The automated configuration and management service 208 is in communication with the sensor manager 206 and the radio interface manager 204 to coordinate operations.

The automated configuration and management service 208 provides direction to the routing service 212 of the communication manager. The routing service 212 is in communication with Transmission Control network stack and the routing tables 216. The routing tables 216 controls routing decisions in the WiHub 200. The routing tables 216 are in communication with TCP/IP network stack 214. The TCP/IP network stack 214 includes network protocols. The TCP/IP stack 214 includes the TCP/IP stack hooks 210a and 210b. TCP/IP stack hook 210a is in communication with the routing service 212 and TCP/IP stack hook 210b is in communication with radio interface manager 204. The TCP/IP network stack 214 uses TCP/IP interface 220-1 and 220-2 in this embodiment. WiHub 200 further includes normal Application Programming Interface (API interfaces 218). API interfaces 218 are used to interface communication links between applications 202 and 204, the TCP/IP Network Stack 214 and the sensor manager 206.

Figure 3A:
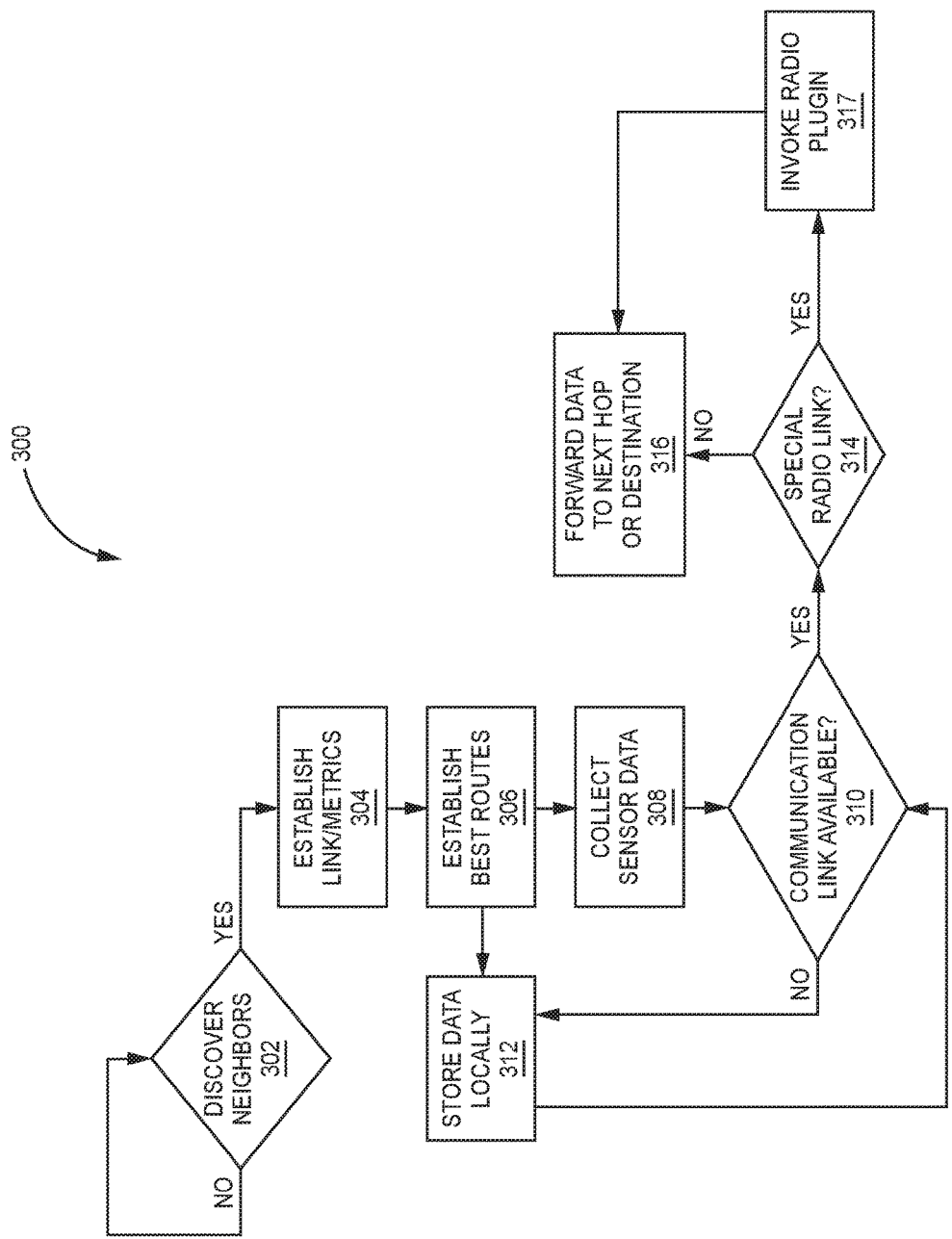
FIG. 3A is WiHub process flow diagram of one embodiment of the present invention.

An example of a WiHub operating process is illustrated in the WiHub process flow diagram 300 of FIG. 3A. The WiHub process flow diagram 300 is described in light of WiHub 100 of FIG. 1. Each WiHub 100, when on, continually monitors for communication signals from other communication systems 120-1 through 120-N, including other WiHubs, that are within range for communications (302). As discussed above, embodiments of the WiHub 100 allow for different types communication signals to establish communication links 121-1 through 121-N. If no communication signal is found within range at step (302), the process continues monitoring for communication signals until the WiHub 100 is turned off. If a communication signal is found within range at step (302), link metrics specific to the type of communication signal discovered are dynamically applied by the communication manager 104 to establish a communication link (304). That is, in an embodiment, the communication manager 104 dynamically interfaces the detected signal format with the communication hub format to create the communication link. The configuration manager 108 of the WiHub 100 then establishes best routes for communication (306). In an embodiment this may be done by implementing routing algorithm instructions stored in the memory 110 as discussed above. In an embodiment, best routes are determined at least in part on which route includes the shortest path, has the most reliable path and has the most secure path. An example of a routing algorithm that could be used is an Open Shortest Path First (OSPF) algorithm but other types of algorithms could be used.

Besides the OSPF routing algorithm discussed above, some embodiments of the WiHub may handle the routing with an ad-hoc algorithm that is a mix between a proactive algorithm and a reactive algorithm. An example of a proactive routing system is Optimized Link State Routing Protocol (OLSR) and an example of a reactive algorithm is ad hoc On-Demand Distance Vector Routing (AODV) or Simple Ant Routing Algorithm (SARA).

Once a best route is established at step (306), information relating to the route, such as but not limited to, hop identification and location information, is stored locally, such as in memory 110 (312). The WiHub 100 also collects sensor data from sensors 130-1 through 130-N via the sensor manager 106 (308). Once sensor data is collected at step (308), it is determined if a communication link is available to a next communication hub (such as another WiHub or other type of communication system) in a determined best route back to a command center, such as command post/operations 466 of FIG. 4 and command center 502 shown in FIGS. 5 and 6. In this example embodiment, if a communication link is not available to an associated command center 502 at step (310), the sensor data is stored locally (312). In an embodiment, stored sensor data stored locally or remotely can be used for after-action reviews. In an embodiment, once a communication link in a best determined route is available at step (310), the stored data, which may include the collected sensor data, routing instruction and communication system identification, is communicated to the next available communication node (or hop), such as a next WiHub in the route to the associated command center 502. In one embodiment, Delay-Tolerant Networking (DTN) is employed. In a DTN system, data is sent to and collected at an "elected" communication hub, such as a selected WiHub. This communication hub may be referred to as a "sub-hub master." If the sub-hub master becomes unavailable, a new one is selected among other communication hubs that are linked. This type of system allows most of the WiHub features to function, even if connection to command center is down. Moreover, in this system, if a group of WiHubs get disconnected from the command center, the group of WiHubs may still be able to access in real time data from all other WiHubs in the group.

In an embodiment, once a communication link is available at step (310), it is determined if a special radio link is present (314). A special radio link is any kind of communication device or network that requires extra handling in order for it to be able to route transit traffic. For example, "tactical radios" used in the military and a LTE network are special radios that require extra handling in order for them to be able route traffic from an to other networks. This also applies to some communication devices currently in use by first responders. In embodiments, the communication devices, such as Land Mobile Radio (LMR), should be IP capable in order to be used with the WiHub. However, the communication devices need not be a "plug and play" devices as they relate to networking since embodiments of the WiHub take care of all of the configuration and special handling of traffic. If a special radio link is present at step (314), a radio plug in, as part of the link metrics, is invoked at step (317) by the communication manager and the data is forwarded to a next hop or destination, such as the command center at step (316). If a special radio link is not present at step (314), data is directly forwarded to a next hop or destination, such as the command center at step (316).

Figure 3B:
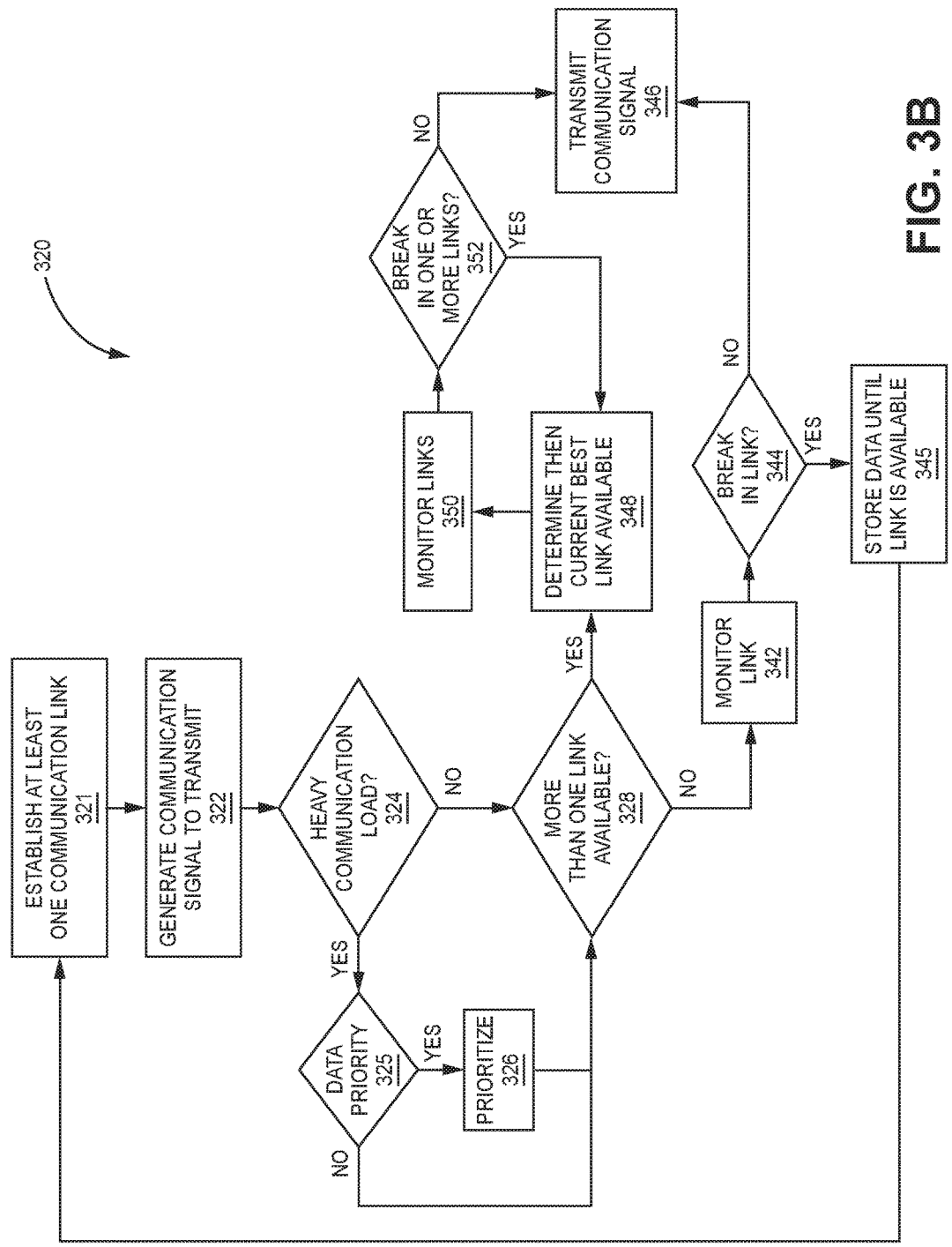
FIG. 3B is WiHub communication process flow diagram of another embodiment of the present invention.

Referring to FIG. 3B, a WiHub communication process flow diagram 320 of an embodiment is illustrated that may be implemented by a controller 102 using an ad-hoc routing algorithm stored in the memory 110 of a WiHub. In this example embodiment, the process starts by establishing at least one communication link that provides a routing path to a destination hub (321). Once data at the WiHub is to be transmitted from the WiHub, a communication signal is generated at step (322). The data may include sensor data, routing data, identification data etc. It is then determined if the communication signal constitutes a heavy communication load (324). If it is determined that there is a heavy communication load at step (324), it is determined if the data in the communication signal should be prioritized (325). Data priority would be applied in a scenario where some of the data in the communication signal has a higher priority than other data in the communication signal. For example, data relating to the health of the responder and location may be designated as a higher priority than other types of data.

If it is determined that data has different priority at step (325), the data in the communication signal is prioritized such that high priority data is sent first (326). If it is determined that data does not have different priority at step (324), the process continues at step (328). At step (328), it is determined if more than one communication link is available for the Wihub that are part of a routing path to the destination hub. If it is determined that only one communication link is available at step (328), the communication link is monitored (342). If a break in the communication link (or a link-quality degradation has occurred), data in the communication signal is stored at step (345) at least until the establishment of at least one data link occurs at step (321). If there is no break in the communication link at step (344), the communication signal is transmitted at step (346).

If at step (328) it is determined that there are more than one communication link available for the WiHub, it is then determined which of the communication links are the best (348). In one embodiment, the available communication links are ranked best by at least one of a least cost route, a most reliable route and a most secure route. These communication links are then monitored at step (350). If there are no breaks in the monitored communication links (352), the data is transmitted over at least one of the best communication links (346). If it is determined that there is a break (or a link-quality degradation) in one or more of the monitored data links at step (352), the process continues at step (348) determining new then current best communication links to transmit the data. Once it is determined there is not a break in the then current best communication link at step (344), the communication signal is transmitted at step (346). In an embodiment, with the determination of more than one link available at step (328), more than one of the then current best communication links are used to transfer the data. Moreover, in an embodiment, the use of two or more of the then current best available communication links are load balanced. Further in one embodiment, load balanced occurs based at least in part on if more than one flow of sensor information exists, if the paths are of equal cost or the sensor information is of different types.

Figure 4:
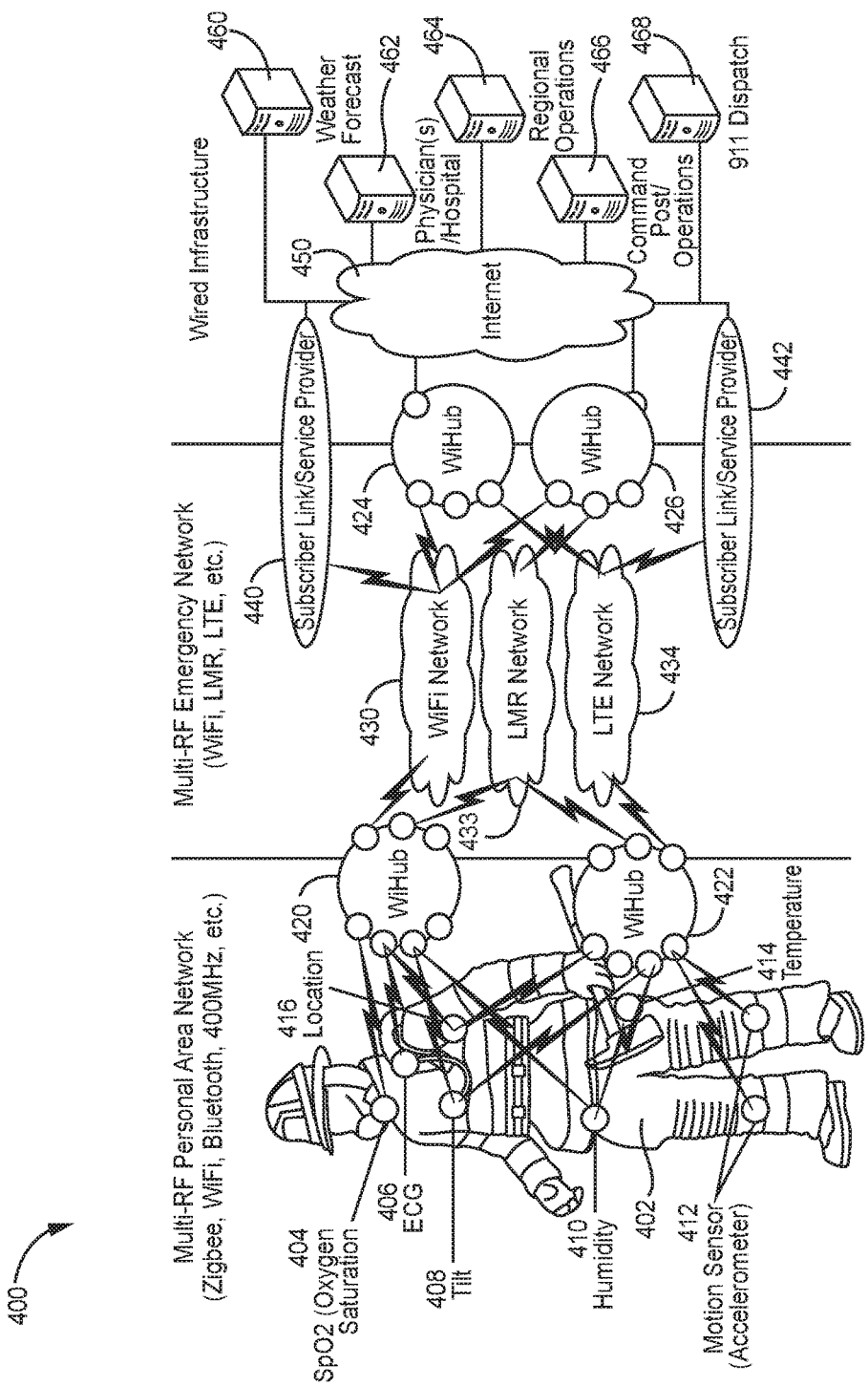
FIG. 4 is an example illustration of a WiHub communication network of one embodiment of the present invention.

Some embodiments of a WiHub build a dynamic robust mesh network from low-cost Commercial Off The Shelf (COTS) wireless and sensor components. As discussed above, embodiments provide a novel method to converge different wireless sensors and devices into a common device and platform to provide robust, fault tolerant data transmission in mixed interference environments. Referring to FIG. 4, an example WiHub communication network 400 using WiHubs 420, 422, 424 and 426 of an embodiment is illustrated. The WiHub communication network 400 of this embodiment includes a first responder 402. The first responder 402, in this example embodiment, has attached a first WiHub 420 and a second WiHub 422. Although, FIG. 4 illustrates the use of two WiHubs 420 and 422 on a responder, only one WiHub is needed. WiHub 420 is in communication with a SpO2 (oxygen saturation) sensor 404, electrocardiogram (ECG) sensor 406, tilt sensor 408, humidity sensor 410 and location sensor 416. The second WiHub 422 is also in communication with the tilt sensor 408, the humidity sensor 410 and location sensor 416. The second WiHub 422 is further in communication with the temperature sensor 414 and motion sensors 412. The first WiHub 420 and a second WiHub 422 are further in communication with other communication systems as available. In the example embodiment, WiHub 420 is in communication with WiFi network 430 and LMR network 432 while WiHub 422 is in communication with the LMR network 432 and the LTE network 434.

In the embodiment illustrated in FIG. 4, WiHubs 424 and 426 (intermediate hubs) provide respective subscriber link/service provider links 440 and 442 between the communication networks 430, 432 and 434 and the internet 450 (another communication system). Coupled to receive and/or pass communications to and from WiHubs 420 and 422 via the internet 450 are a weather forecast server 460, physicians/hospital 462, regional operations 464, command post/ operations 466 and 911 dispatch 468 in this example embodiment.

Embodiments of WiHub communication networks may use several frequencies operating at different wavelengths. This includes support for commercial cellular networks including LTE bands. This is accomplished by using different RF devices operating at different frequencies, such as but not limited to, WiFi at 2.4/5 GHz, 30 MHz radio modem, 700/850/1700/1900/2500 MHz Radio/LTE modems available in the market, ZigBee at 2.4 GHz, LMR, Bluetooth, etc.). Each communication system has different properties and is able to circumvent different types of interference and obstacles which block RF transmissions. By combining these wireless devices and frequencies, the WiHub communication network builds a robust system capable of communications in a broad range of environments as well as being compatible with a larger range of end devices. WiHub communication networks create a bridge between many RF networks; converging the separate networks into a single network which has more diversity and redundancy which provides more resilience to faults and interference. Moreover, embodiments may employed security measures to prevent unauthorized reading of transmitted communications and data stored in the memory of the WiHub.

Figure 5:
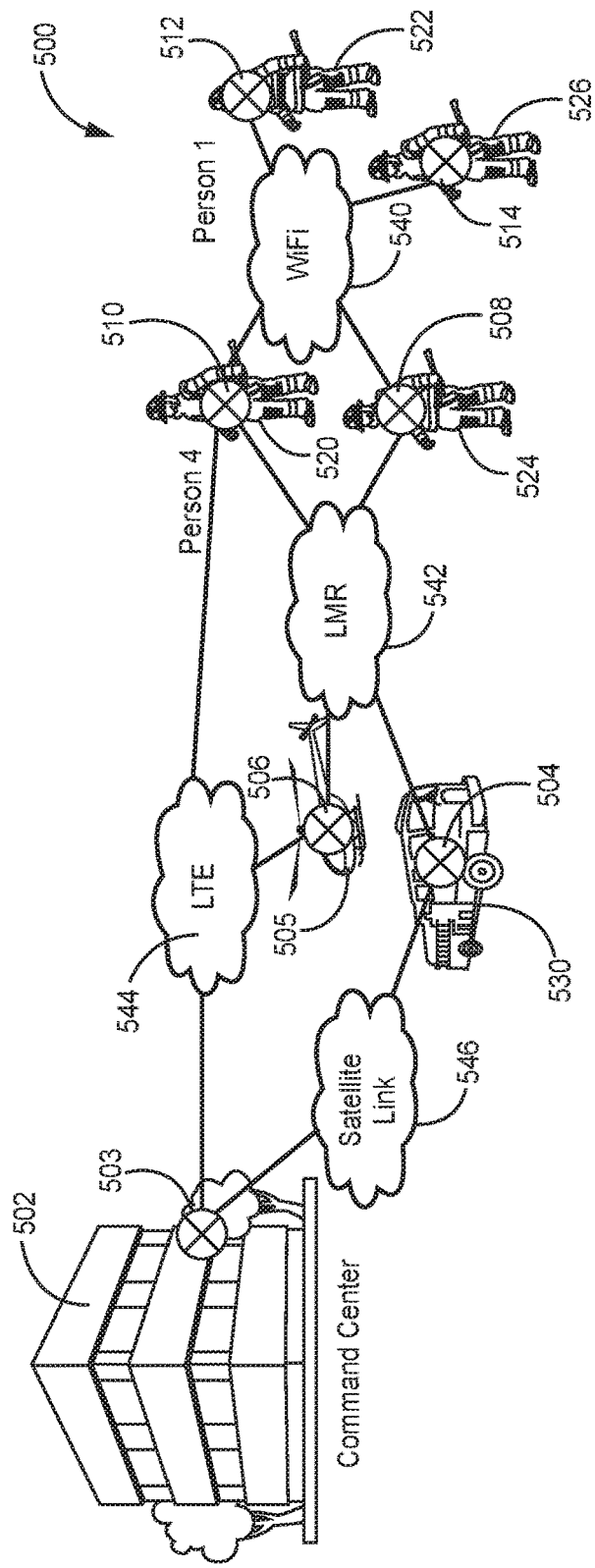
FIG. 5 is another example illustration of a WiHub communication network of one embodiment of the present invention.

Another example of a WiHub communication network 500 is illustrated in FIG. 5. In the FIG. 5 example embodiment, a command center 502 is in communication with various WiHubs 503, 504, 506, 508, 512, 514 and 520. WiHub 503 is used as a communication link to the command center 502 in this embodiment. WiHub 506 is attached to a helicopter 505 and WiHub 504 is attached to a rescue vehicle 530. WiHub 510 is attached to a first responder 520 and WiHub 512 is attached to a second first responder 522. WiHub 508 is attached to a third first responder 524 and WiHub 514 is attached to a fourth first responder 526. As illustrated in this example WiHub communication network 500, WiFi communication system 540 is used to communicate between first responder 512 and WiHubs 508, 510 and 514. In turn, LMR communication system 542 is used to communicate between WiHubs 508 and 510 and WiHubs 506 and 504. In addition, WiHub 510 is also in communication with LTE communication system 544. Also in communication with the LTE communication system 544 is WiHub 506. A satellite communication system 546 is used to provide communication between the command center 502 and WiHub 504 on the rescue vehicle 530. The command center 502 in this example is also in communication with the LTE communication system 544 via WiHub 503. As illustrated, the WiHub communication network 500 can use different communication paths as needed.

In embodiments, WiHub devices bridge all of the disjointed radio clouds forming one big network as illustrated in FIG. 5. The new network 500 provides end to end connectivity across heterogeneous radio clouds. From the point of view of users and applications, the underlying radio topology is completely transparent. All of the configuration, tunneling, or special handling of packets through radio networks are handled by the WiHub software. In FIG. 5 for example, without a WiHub, the only person who could communicate with the command center 502 is first responder 520 through the LTE communication system 544. The other three responders 522, 524 and 526 are cut-off due to being out of range or because of weak radio signals via other links (basement of a building for example). Responders 520, 522, 524 and 526, however, are within one WiFi communication system (network) 540, so they can still communicate with each other via network 500. With a WiHub network, any link available to any person on a cloud is going to be available to all people on the same cloud through transit links. Responders 522 and 526 would be able to communicate (voice chat, stream video, etc.) with the command centers and all other parties on WiHub network 500. If any link fails for any reason during the communication, for example if responder 520 loses LTE connectivity, the failure is auto-detected immediately in embodiments and any data connection will be rerouted accordingly without operator intervention.

As discussed above, the WiHub network 500 includes the ability to quickly and automatically connect to all sensors available to the first responder and the ability to use and utilize multiple links at the same time to connect to other WiHub devices within the same team and also with the command center 502. This provides an innovative multifrequency network that has diversity and robustness. Diverse systems are robust and can withstand natural interference, faults and even attacks. Moreover, embodiments allow a group of WiHubs to form a network themselves and work without a connection to the outside world. That is, they can work "off line" (i.e. share sensor data and communications) without connection to the internet/cloud.

As discussed above, WiHub devices 508, 510, 512 and 514 within WiFi range of each other connect to form a fully connected mesh network. When a direct connection is not available due to distance, other devices that happen to be in between to act as bridges to relay data packets form one end to another. This functionality is built in to the link layer (i.e., layer two in networking terms) making it very robust and completely transparent to higher layer applications and routing functions running on WiHub. This system is designed so that WiHubs are always connected as long as the devices are running, and even if there are failures in higher level functions.

Some embodiments of WiHub may augment the routing algorithm with new radio control features to be able to turn on and off individual radios on a machine either in cases where no known RF endpoint exist, or cases where a timed polling sequence is used to minimize use of a specific spectrum requiring more power. Radios draw significant power, so by controlling when unused radios can be powered down will greatly improve the battery lifetime of the device. Additional power-aware routing will be handled by the status monitoring system hooks which will allow data to be load balanced across redundant paths so power drain is not concentrated on any one node in a mesh network which is web-like and may contain many redundant paths. Algorithms such as OLSR and AODV will find a path and reuse the same one until it dies, this will concentrate the power drain instead of sharing it across many nodes. This reuse of a path system combined with other techniques will increase battery and node lifetime significantly.

Figure 6:
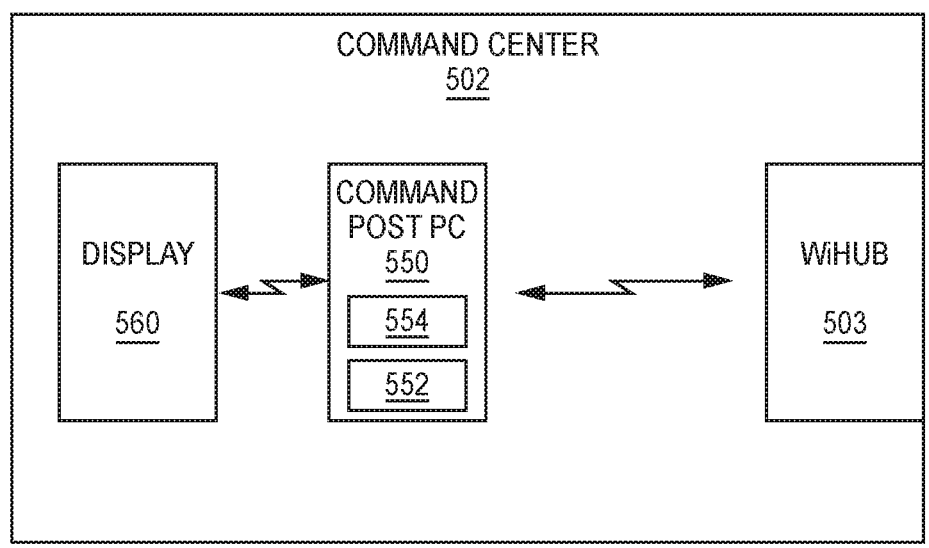
FIG. 6 is an illustration of a command center of one embodiment of the present invention.

Collecting data and sensor information and providing robust communication channels are one of the features of WiHub. In order to fully utilize this data, embodiments comes with a visualization tool that provides easy access to the data and helps first responders to have full information and control at an incident scene. In embodiments, link information, sensor information and other node data statistics are all gathered and sent periodically to the visualization tool via the communication links. Referring to FIG. 6, an illustration of the command center 502 and the command center WiHub 503 is provided. As illustrated, WiHub 503 is in communication with at least one command post PC 550. The Command post PC 550 in this embodiment implements a visualization tool 554 with a processor 552 that is displayed on display 560. The visualization tool 552 incorporates maps with live GPS data from the different WiHub devices, such as WiHubs 504, 506, 508, 510 and 512 of FIG. 5. The command center 502 can coordinate a response to an emergency situation using the visualization tool.

Figure 7:
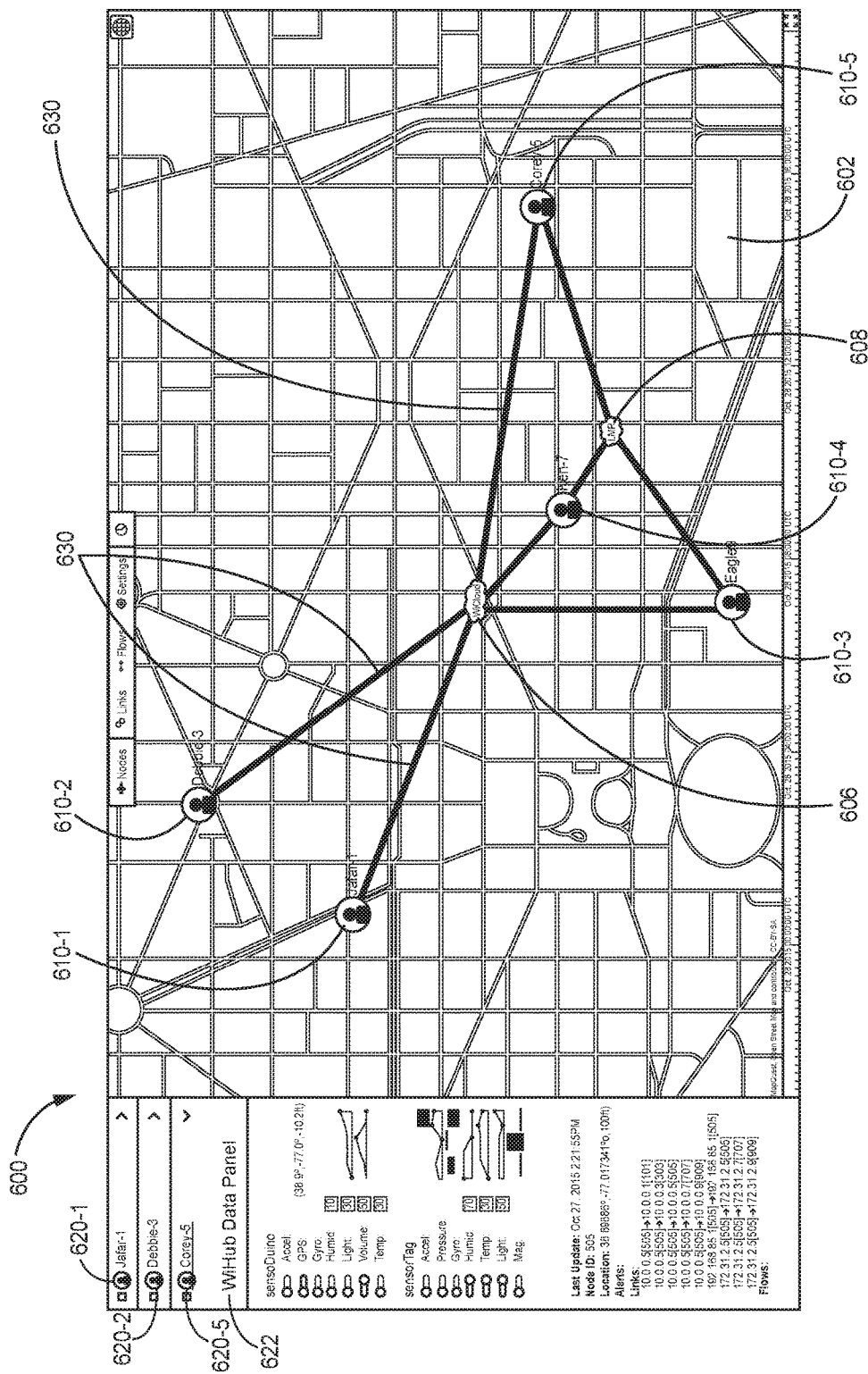
FIG. 7 is an example screen shot of a visualization tool of one embodiment of the present invention.

An Example of a WiHub visualization tool 600 on a display is shown in a screen shot of FIG. 7. In this example, each device displayed corresponds to a responder 610-1 through 610-5. When a device comes online, sensor data associated with each responder 610-1 through 610-5 is shown in real time on the map 602 as illustrated in FIG. 7. They are all connected via WiFi (WiFi communication system) forming a subnet called WiCloud 606. The three responders 610-3, 610-4 and 610-5 on the lower right of the map 602 have LMR radios creating another subnet called LMR 608. Depending on the availability and the quality of the links, data is routed using the best route from source to destination. Sensor data for each responder 610-1 through 610-5 is illustrated. In this example embodiment, clicking on a person's icon (Corey-5 (610-5) in this case) reveals detailed information about the responder 610-5 on WiHub Data Panel 622 on the left of the screen shot 600 including the responders 610-5 entire sensor data represented in text or graphical formats.

In embodiments, link information and other node data statistics are all gathered and sent periodically to the visualization service. In embodiments of the visualization tool 600, all responders carrying WiHub devices and connected to the WiHub network show up on the map with location information as reported by their GPS or other type of location sensor used. In an embodiment, links 630 between responders are shown as illustrated in FIG. 7. The links 630 between responders 610-1 through 610-5 (nodes) give a complete picture of the topography of the WiHub network at any given moment. When a new responder connects to the WiHub network they immediately pop up on the map 602. The links 630 and the WiHub network topology are updated to reflect the addition of the new responder. Likewise, if a responder disconnects from the WiHub network they are removed from the map 602. In an embodiment, the map 602 may be dragged, rotated and zoomed in or out to change the perspective in 2D or 3D so the command center can get a good handle on the locations of the responders 610-1 through 610-5 and the network topography at any given time.

As discussed above, clicking on a responder icon on the map 602 or on the left panel opens up detailed information about the responder including technical information such as available links, IP addresses and neighboring IP addresses. The panel 622 also shows all of the sensor information from the available sensor devices on that particular responder. Each sensor data stream is represented graphically or textually on the panel 622. In an embodiment, at least some of the sensors have a threshold that triggers an alert if the sensor data falls outside an acceptable range. For example, alerts (alarms) may be enabled if the temperature goes above 100° F. or humidity goes above 70%. If an alert is triggered, in an embodiment, a symbol in the panel that represents the sensor flashes red. Moreover, in one embodiment, a symbol (such as an image) associated with a responder on the map 602, starts to blink when a threshold of an associated sensor has been reached. The alerts notify the command center that a responder requires immediate attention. In addition, in one embodiment, in response to a threshold trigger being reached, an alarm signal is sent through the speaker 115 of the Wihub 100 to inform the responder. The network topology as indicated in the screen 602 is dynamically updated to reflect the actual status on the ground. Hence, as the responders move around in relation to each other and communication links change, this information is reflected in the map 602.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A communication hub that manages communication signals between said communication hub and a plurality of communication systems that use a plurality of different communication signal formats to form a communication network, said communication hub also manages sensor signals between said communication hub and a plurality of sensors that use a plurality of different sensor signal formats, the communication hub comprising:
   communication signal gateways configured to receive and transmit said communication signals with said plurality of different communication signal formats;
   sensor signal gateways configured to receive said sensor signals with said plurality of different sensor signal formats;
   a controller configured to dynamically interface said different sensor signal formats of said received sensor signals at said sensor signal gateways into said different communication signal formats to send sensor information over communication links of said different communication systems, said controller further configured to establish at least one routing path to a destination using at least one of said communication links, said controller further yet configured to communicate said sensor information through said at least one established routing path, wherein said plurality of communication systems include a WiFi mesh communication system and a land mobile radio (LMR) communication system, wherein the controller is configured to bridge the WiFi mesh communication system with the LMR communication system to converge the WiFi mesh communication system and the LMR communication system into a single routable network;
   a storage medium in communication with said controller, said storage medium configured to store operating functions of said controller; and
   a power source selectively coupled to provide power for said communication hub.

2. The communication hub of claim 1, wherein the communication signal gateways further comprise:
   a plurality of communication receivers, said plurality of communication receivers including at least one first communication receiver configured to receive a WiFi communication signal and at least one second communication receiver configured to receive a communication signal from an LMR; and
   a plurality of communication transmitters, said plurality of communication transmitters including at least one first communication transmitter configured to transmit a WiFi communication signal and at least one second communication transmitter configured to transmit a communication signal to the LMR.

3. The communication hub of claim 1, wherein said controller is further configured to monitor for said different types of communication signals received at said communication signal gateways.

4. The communication hub of claim 1, further comprising:
a power on indicator selectively coupled to said power source to indicate when said communication hub is operational; and
an established communication link indicator in communication with said controller, said established communication link indicator configured to indicate when said at least one established communication links has been established.

5. The communication hub of claim 1, wherein dynamically interface includes tunnel the sensor information through the LMR communication system.

6. A method of operating a communication hub managing communication signals between said communication hub and a plurality of communication systems using a plurality of different communication signal formats to form a communication network, said communication hub also managing sensor signals between said communication hub and a plurality of sensors using a plurality of different sensor signal formats, the method comprising:
monitoring for said communication signals from said plurality of communication systems, wherein said plurality of communication systems include a WiFi mesh communication system and a land mobile radio (LMR) communication system;
upon detection of at least one communication signal from one of said plurality of communication systems and upon receiving at least one sensor signal from said plurality of sensors, automatically interfacing a sensor signal format of said at least one received sensor signal with said at least one communication signal to send sensor information over a communication link of one of said plurality of communication systems;
bridging the WiFi mesh communication system with the LMR communication system to converge the WiFi mesh communication system and the LMR communication system into a single network; and
communicating said sensor information through said communication link using said communication signal format of said detected at least one communication signal.

7. The method of claim 6, wherein receiving said at least one of sensor signal from said at least one of said plurality of said sensors further comprises:
receiving a plurality of different type sensor signals from said plurality of said sensors, at least one sensor of said plurality of sensors being of a different type than another sensor of said plurality of sensors.

8. The method of claim 6, wherein said sensor signals from said plurality of sensors comprises at least one sensor signal from at least one of temperature sensors, heartbeat sensors, blood pressure sensors, carbon monoxide sensors, oxygen level sensors, global positioning sensors, magnetometer sensors, accelerometer sensors, gyroscope sensors, touch sensors, microphones and luminance sensors.

9. The method of claim 6, further comprising:
establishing a first communication link for the WiFi communication system;
establishing a second communication link for the LMR communication system;
determining whether a best route to a destination is via the first communication link or the second communication link; and
forwarding said sensor information to said destination via said determined best route.

10. The method of claim 9, wherein said best route is determined based at least in part on one of a least cost route, a most reliable route and a most secure route.

11. The method of claim 6, further comprising:
storing sensor information in a storage medium of said communication hub.

12. The method of claim 6, further comprising:
prioritizing said sensor information based on importance; and
communicating said sensor information pursuant to said prioritization.

13. The method of claim 9, wherein determining whether a best route is via the first communication link or the second communication link includes:
ranking best routes to a destination based at least in part on one of least cost paths, most reliable paths and a most secure paths.

14. The method of claim 13, further comprising:
rerouting a communication path to said destination from the first communication link to the second communication link in response to a break in said first communication link.

15. The method of claim 13, further comprising:
load balancing communication of said sensor information in communication signals between the first communication link and the second communication link.

16. The method of claim 6, further comprising:
manipulating said at least one sensor with sensor manipulation instructions communicated to said communication hub through said established communication link.

17. The method of claim 6, wherein said sensor signal comprises at least one of a WiFi signal, Bluetooth signal, Bluetooth Low-Energy signal, ZigBee signal and 6LOWPAN signal.

18. The method of claim 6, further comprising:
selectively turning on and off select detecting and transmitting features of said communication hub relating to specific communication signal formats not being used by said communication hub to conserve battery power.

19. The method of claim 6, further comprising:
reading received routing instructions in said at least one detected communication signal; and
communicating information contained in said at least one detected communication signal through another established communication link pursuant to said received routing instructions.

20. The method of claim 19, further comprising:
storing at least one of said routing instructions and said information contained in said at least one communication signal in a storage medium of said communication hub.

21. A method of operating a communication hub to manage communication signals between said communication hub and a plurality of communication systems using a plurality of different communication signal formats, said method also managing sensor signals between said communication hub and a plurality of sensors using a plurality of different sensor signal formats, the method comprising:
receiving said sensor signals from said plurality of different types of sensors at sensor signal gateways of said communication hub;
detecting said communication signals received by communication signal gateways of said communication hub;

dynamically interfacing said sensor signal formats of said received sensor signals with said communication signal formats of said plurality of communication systems to send sensor information over at least one communication link between said communication hub and said communication systems associated with said detected communication signals, wherein said plurality of communication systems include a WiFi mesh communication system and a tactical radio communication system;

bridging the WiFi mesh communication system with the tactical radio communication system to converge the WiFi mesh communication system and the tactical radio communication system into a single network;

determining at least one routing path from said at least one communication hub to a destination hub using at least one of said at least one established communication link; and communicating said sensor information and routing information through said at least one routing path.

22. The method of claim 21, further comprising:
controlling at least one of said plurality of different type sensors through said at least one routing path to said at least one communication hub.

23. The method of claim 21, wherein said plurality of different types of sensors comprises at least one of temperature sensors, heartbeat sensors, blood pressure sensors, carbon monoxide sensors, oxygen level sensors, global positioning sensors, magnetometer sensors, accelerometer sensors, gyroscope sensors, touch sensors, microphones and luminance sensors.

24. The method of claim 21, further comprising:
displaying on a display said communicated sensor information with a visualization tool.

25. The method of claim 21, further comprising;
setting off an alarm when said sensor information has reached a predetermined limit.

26. The method of claim 21, further comprising:
dynamically changing properties of a communication signal between said communication hub and another communication hub to circumvent at least one of interferences and obstacles.

* * * * *